US005669190A

United States Patent [19]

Szyjkowski

[11] Patent Number: 5,669,190

[45] Date of Patent: Sep. 23, 1997

[54] FASTENING MECHANISM FOR ACCESS PANELS AND GRILLS USING SCREW DRIVEN ARM

[75] Inventor: Jerzy Szyjkowski, Caledon, Canada

[73] Assignee: Novera Products Inc., Caledon, Canada

[21] Appl. No.: 631,285

[22] Filed: Apr. 8, 1996

[51] Int. Cl.[6] .............................. E04H 7/00; F16B 21/00

[52] U.S. Cl. .............................. 52/196; 52/202; 411/551; 411/552; 49/465

[58] Field of Search .............................. 411/551, 552, 411/553, 549, 550; 52/196, 202, 220.8; 49/465

[56] References Cited

U.S. PATENT DOCUMENTS

| | | | |
|---|---|---|---|
| 2,486,670 | 11/1949 | Nigg et al. | 411/551 |
| 2,662,260 | 12/1953 | Marschner | 411/551 |
| 2,882,580 | 4/1959 | Barsalou | 411/551 |
| 3,088,560 | 5/1963 | Preuss | 189/36 |
| 3,340,661 | 9/1967 | Krieger | 52/456 |
| 3,383,811 | 5/1968 | Ades | 52/28 |
| 3,704,563 | 12/1972 | Waller | 52/455 |
| 4,113,303 | 9/1978 | Yench | 296/137 |
| 4,890,418 | 1/1990 | Sachs | 49/463 |
| 4,970,836 | 11/1990 | Brown | 52/221 |
| 5,073,075 | 12/1991 | Duran | 411/552 |
| 5,267,820 | 12/1993 | Sturtevant | 411/551 |
| 5,361,541 | 11/1994 | Szyjkowski | 49/465 |

FOREIGN PATENT DOCUMENTS

| | | |
|---|---|---|
| 2424372 | 11/1979 | France . |
| 1134151 | 3/1996 | United Kingdom . |

*Primary Examiner*—Neill R. Wilson
*Attorney, Agent, or Firm*—Peter R. Hammond

[57] ABSTRACT

A detachable panel or grill for covering an opening in panelling of a wall or ceiling or in an appliance. The panel can be installed quickly and rigidly without the need for any special framing. The panel or grill can be installed or removed by the rotation of a single screw which passes through a threaded opening in an elongate fastening arm. The arm extends generally parallel to an inner surface of the panel during use thereof. The arm is pivotable relative to the panel between a first position usable for insertion of the arm into the opening and a second position used for clamping the panel to edge structure defining the opening. A slideway is connected to an inner surface of the panel and limits the extent of pivotal movement of the arm. The screw extends through a hole in the panel and connects the arm to the panel. A spring biases the arm so that it pivots towards the second position. In this position the arm travels transversely towards the inner surface of the panel when the screw is turned in one direction. Rotation of the screw in the opposite direction loosens the panel and enables removal thereof from the opening.

19 Claims, 1 Drawing Sheet

FASTENING MECHANISM FOR ACCESS PANELS AND GRILLS USING SCREW DRIVEN ARM

BACKGROUND OF THE INVENTION

This invention relates to an access panel or grill for covering an opening in a structure such as a wall or ceiling or in ductwork or in an appliance.

Covers for covering an opening in a wall or ceiling or in ductwork are known. Often the opening has been provided to permit access to an installation or equipment behind the opening. Such covers can include access doors and access panels. Often such doors and panels in the past have required some kind of framing permanently attached to adjacent studs or to the panelling around the opening. Other known panels which can be made out of plastic do not require framing but such panels may not be firmly installed or attached in the adjacent structure. Also, many applications for such access panels and doors in buildings such as commercial buildings and highrises preclude the use of plastic panels and doors.

U.S. Pat. No. 5,361,541 issued Nov. 8, 1994 to Superflex, Inc. describes a removable access door for covering a small opening in a wall or ceiling. The door includes a panel member and at least two devices for removably attaching this member to adjacent structure. Each device includes a clamping member pivotably mounted adjacent a side edge of the panel and an engagement member for pivoting the clamping member from a first position that permits the clamping member to be inserted into the opening towards a second position where the clamping member extends behind an edge section of the structure. A coil spring biases the attaching devices to swing the clamping members to the second position and releasably clamp the edge sections.

Earlier U.S. Pat. No. 4,970,836 issued Nov. 20, 1990 to Air Concepts, Inc. describes a closure device for an opening that includes a face plate and manually driven spring biased latching mechanisms for securing the device in closing relationship to the opening. A pair of screws that can be turned from the outer surface of the face plate are used to move the latching mechanisms to the required position.

It is an object of the present invention to provide a detachable panel or grill that can be easily and quickly installed in order to cover an opening in a structure such as a wall, duct or appliance.

It is a further object of the invention to provide a panel or grill suitable for covering an opening, which panel or grill does not require any special framing to be provided or constructed or separate fasteners in order to permit it to be fastened to adjacent studs.

It is another object of the invention to provide a detachable grill or panel suitable for covering an opening in a variety of structures, which panel or grill can be installed in a safe, tight and rigid manner.

SUMMARY OF THE INVENTION

According to one aspect of the invention, a detachable panel device for covering an opening in a structure, duct or appliance includes a generally flat panel having an inner surface and an outer surface and an elongate fastening arm member located adjacent the inner surface and extending during use thereof generally parallel to the inner surface. The arm member is pivotable relative to the panel between a first position usable for insertion of the arm member into the opening and a second position used for clamping the panel to edge structure defining the opening. A slideway member connected to the inner surface of the panel limits the extent of pivotable movement of the arm member relative to the panel. A threaded member has a head at one end thereof and a stop at an opposite end thereof. This threaded member extends through a hole formed in the panel and a threaded hole formed in a central section of the arm member and it connects the arm member to the panel. A spring acts on the arm member to bias it so that the arm member pivots towards the second position. In this second position, the arm travels towards the panel when the threaded member is turned in one predetermined direction so that the edge structure can be clamped between opposite end sections of the arm member and the panel.

Preferably the spring is an elongate coil spring having one end thereof connected to the arm member.

According to another aspect of the invention, a detachable grill device for covering an opening in a structure, duct or appliance, includes a generally flat grill having inner and outer sides and an elongate fastening arm member positioned adjacent the inner side and extending during use thereof generally parallel to the inner side. The arm member is pivotable relative to the grill between a first position used for insertion of the arm member into the opening and a second position used for clamping the grill to edge structure defining the opening. A slideway is connected to the inner side of the grill and limits the extent of pivotable movement of the arm member relative to the grill. A threaded member has a head at one end thereof and a stop at an opposite end thereof. This member extends from the head through a hole formed in the grill and then through a threaded hole formed in a central section of the arm member. The threaded member connects the arm member to the grill and a spring acts on the arm member to bias it so that the arm member pivots towards the second position. In this second position, the arm member travels towards the grill when the threaded member is turned in one predetermined direction so that the edge structure can be clamped between opposite end sections of the arm member and the grill.

According to a further aspect of the invention, a cover device for covering an opening in a structure, duct or appliance, includes a cover with a peripheral edge portion, an inner side and an outer side and an elongate fastening member located adjacent the inner side and extending during use thereof generally parallel to the inner side. The fastening member is pivotal relative to the cover about a pivot axis perpendicular to the cover between a first position usable for insertion of the fastening member into the opening and a second position used for clamping the cover to edge structure defining the opening. There are means provided on the cover to limit the extent of the pivotal movement of the fastening member relative to the cover. A threaded member having a head at one end extends through a hole formed in the cover and a threaded hole formed in the fastening member and connects the fastening member to the cover. There are also means for biasing the fastening member so that it pivots about the pivot axis towards the second position. In this second position the fastening member moves towards the inner side of the cover when the threaded member is turned in one predetermined direction so that the edge structure can be clamped between end sections of the fastening member and the peripheral edge portion of the cover.

In one preferred embodiment the cover is a generally flat panel and the biasing mechanism is a spring.

Further features and advantages will become apparent from the following detailed description taken in conjunction with the accompanying drawings.

BRIEF DESCRIPTION OF THE DRAWINGS

A detachable access panel device 10 for covering an opening 12 in a structure is shown in FIGS. 1 to 4 of the drawings. This panel device can be used to cover an opening in any one of a variety of structures such as a wall or ceiling made with panelling or wallboard and a duct or appliance that can be made with sheet metal or other materials. The illustrated preferred panel device includes a generally flat panel 1 having an inner surface 14 and an outer surface 16. An elongate fastening arm member 3 is located adjacent the inner surface 14 and extends during use thereof generally parallel to the inner surface as shown in FIG. 1. As shown in FIGS. 2 and 3, the arm member 3 is pivotable relative to the panel 1 between a first position shown in FIG. 3 usable for insertion of the arm member into the opening 12 and a second position shown in FIG. 2 used for clamping the panel to edge structure 7 defining the opening. A slideway member is connected to the inner surface 14 of the panel and acts to guide the movement of the arm member 3. The slideway 6 in fact limits the extent of pivotable movement of the arm member 3 relative to the panel. In the preferred embodiment illustrated in FIGS. 2 and 3, the slideway member 6 limits the extent of pivotal movement of the arm member to an angle of approximately 45 degrees. This amount of pivotable movement is generally desirable for the square panel of FIGS. 1 to 4 since it reduces the effective width (either horizontally or vertically) of the arm member to the maximum extent for insertion of the panel device in a square opening.

Figure 1:
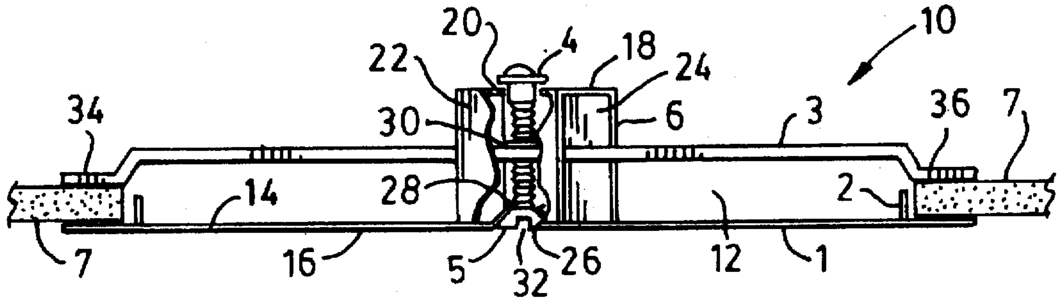
FIG. 1 is a side view of a preferred embodiment of the invention, which view is partially in cross-section.

It will be understood that the slideway 6 constitutes means for limiting the extent of the pivotable movement of the arm or fastening member 3 relative to the panel or cover 1. The illustrated slideway is a channel shaped member that includes an end wall 18 with an opening 20 formed therein. The end wall is connected to the panel 1 by means of sidewalls 22 and 24. The illustrated slideway thus extends around the arm member 3.

A threaded member or screw 5 has a head 26 at one end thereof and a stop 4 at an opposite end thereof. It will be understood that rotation of the threaded member 5 by means of a screwdriver will drive the fastening arm 3 towards or away from the inner surface 14 of the panel, the direction of the movement depending upon the direction of rotation of the threaded member. This is because the threaded member extends through a hole 28 formed in the panel 1 and also through a threaded hole located at 30 formed in a central section of the arm member 3. The threaded member 5 connects the arm member to the panel 1. As shown, the hole 28 is located substantially in the centre of the panel 1. The illustrated threaded member 5 has a screw-type head which is located on the outer surface 16 of the panel and is formed with a slot 32. The head 26 of the screw may be located in a recess formed in the centre of the panel in order to provide for an uninterrupted, smooth external surface after installation of the panel. The stop 4 of the screw can be located in the opening 20 in end wall 18. There can be a degree of play between the stop 4 and the hole 20 in order to permit a firm gripping action between both ends 34 and 36 of the fastening arm 3 and the adjacent edge structure 7 even in locations where the thickness of the panelling forming the edge structure is not quite the same from one side of the opening 12 to the other side.

Figure 2:
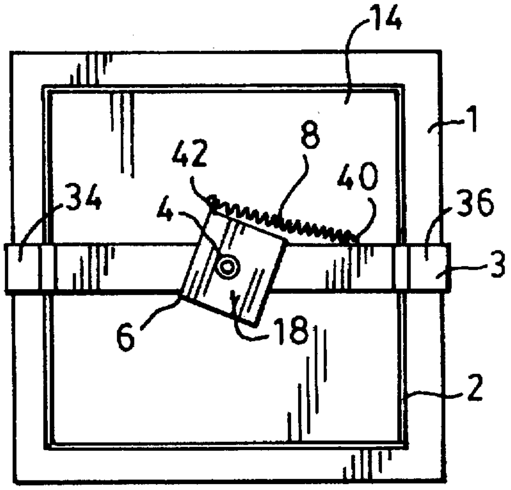
FIG. 2 is a rear view of the panel device, which view shows the fastening arm in the clamping position.

A coil spring 8 acts on the arm member 3 to bias the arm member so that the arm member pivots towards the second position shown in FIG. 2. In this second position, the arm member 3 travels towards the panel 1 when the threaded member 5 is turned in one predetermined direction, normally the clockwise direction, so that the edge structure 7 can be clamped between the opposite end sections 34, 36 of the arm member and the panel 1. The illustrated spring is an elongate coil spring having one end 40 connected to the arm member 3. As illustrated, the opposite end 42 of the spring is connected to one corner of the slideway 6. Different kinds of springs can be used to provide means for biasing the arm member or fastening member 3 so that it pivots about its pivot axis towards the second position shown in FIG. 2. Samples of other springs that could be used for this purpose include a compression spring or a spiral spring, the latter being mounted with the threaded member 5 at its center.

To explain the operation of the present panel device further, in the second position shown in FIG. 2, the end sections 34 and 36 are positioned so that they extend behind the edges of the edge structure 7, the position required for the panel device to be secured in the opening 12. Assuming that the panel device is in the position shown in FIG. 1 but is not yet installed in the opening, then in order to install the panel device, the threaded member 5 is normally rotated counterclockwise. Because the spring 8 prevents counterclockwise rotation of the arm member 3, the threaded member will rotate in the arm member which will travel along the threaded member until it reaches the stop 4. The stop 4 then prevents further travel of the arm member in a direction away from the panel 1. At this point further counterclockwise rotation of the threaded member 5 results in the tension of the spring 8 being overcome and the fastening arm 3 swinging to the position shown in FIG. 3. In this position, the arm member 3 can readily be inserted through a suitably sized opening for installation of the panel, grill or cover.

After the arm member 3 has been inserted through the opening 12, the counterclockwise forced applied to the threaded member 5 can be released, automatically causing the arm member to swing to the second position shown in FIG. 2. Then, rotation of the threaded member 5 in the clockwise direction causes the arm member 3 to travel towards the panel 1. Upon sufficient tightening of the threaded member, the edge structure 7 will be clamped between the opposite end sections 34, 36 of the arm member and the inner surface or inner side of the panel 1.

Figure 3:
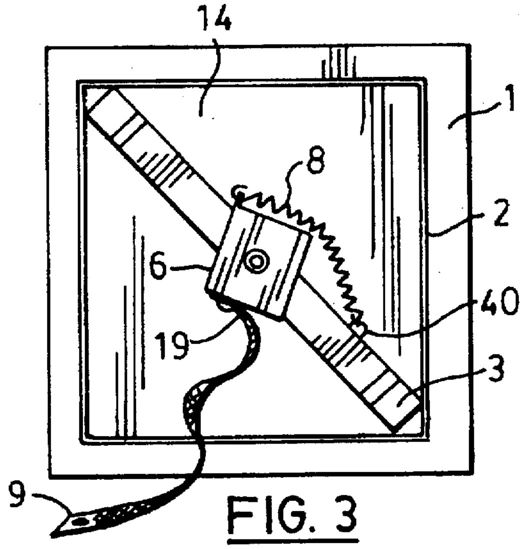
FIG. 3 is another rear view of the panel device, this view showing the fastening arm in another position that permits insertion and removal of the panel device from an opening.
Figure 4:
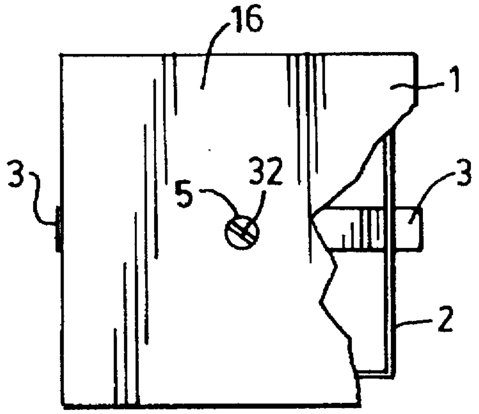
FIG. 4 is a front view of the panel device with the panel section partially cut-away for illustration purposes.

After installation of the panel device, if one then wishes to remove it from the opening 12, it is simply necessary to use the proper tool again, for example a screwdriver, to engage the head of the threaded member 5 and to rotate this member counterclockwise thereby moving arm member 3 away from the edge structure and away from the panel and eventually swinging it to the position shown in FIG. 3.

As shown in the drawings, a stiffener guide 2 can be provided on the inner surface of the panel 1, the guide extending about the perimeter of the panel. This guide helps to stiffen the panel 1 and it also makes it easier to align the panel in the opening 12. The guide 2 can also help prevent movement of the access panel in the opening after it has been installed.

Figure 5:
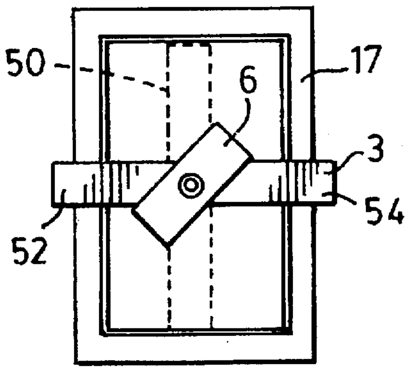
FIG. 5 is a rear view of a second embodiment of the panel device, which embodiment has a rectangular shape.

A second embodiment of the panel device of the invention is shown in FIG. 5. In this second embodiment, the panel 17 is rectangular having a length greater than its width. With a rectangular panel as illustrated, it is possible to provide for a swinging movement of the fastening arm 3 through an angle of approximately 90 degrees. The slideway member 6 of the FIG. 5 version limits the extent of the pivotable movement of arm member 3 to an angle of approximately 90 degrees. The broken line 50 shown in FIG. 5 illustrates the position of the fastening arm 3 for insertion or removal of the access panel or grill into or from the opening. The position for the arm member 3 used for the purpose of fastening the panel 17 in the opening is shown in solid lines. It should be noted that with this rectangular version, a greater protrusion of the ends 52, 54 of the fastening arm 3 behind the edge of the opening is allowed.

An optional feature of the panel device 10 is the use of an insulating strip (not shown) near the edge of the inner surface 14 of the panel 1. The use of such a strip can make the panel installation air tight, a particularly desirable feature in an air duct insulation.

Another optional feature that can be used with the panel device 10 is the use of a safety strip 9 shown in FIG. 3. The use of such a strip can provide added safety where the panel 10 is to be installed high above ground or is to be installed overhead. It will be understood that one end 19 of the safety strip or cable 9 is attached to the panel device while the opposite end is fastened to the nearest stud of the wall or ceiling if it is a wall or ceiling installation or to the ductwork or appliance. A screw or other suitable fastener can be used for this connection.

It will be noted that the above described panel device or grill can be installed or removed quickly and easily by the rotation of a single, centrally located screw or threaded member. The screw or threaded member can be rotated by means of an ordinary common tool such as a screwdriver or a wrench. Further, installation of the present panel device 10 or grill does not require any special framing or treatment of the edges of the opening prior to installation.

As will be apparent to those skilled in this art, various modifications and changes can be made to the described panel device without departing from the spirit and scope of this invention. Accordingly, all such modifications and changes as fall within the scope of the appended claims are intended to be part of this invention.

I claim:

1. A detachable panel device for covering an opening in a structure, duct or appliance, said device comprising:

a generally flat panel having an inner surface and an outer surface;

an elongate fastening arm member located adjacent said inner surface and extending during use thereof generally parallel to said inner surface, said arm member being pivotable relative to said panel between a first position usable for insertion of said arm member into said opening and a second position used for clamping said panel to edge structure defining said opening;

a slideway member connected to said inner surface of the panel and limiting the extent of pivotable movement of said arm member relative to said panel;

a threaded member having a head at one end thereof an a stop at an opposite end thereof, said threaded member extending through a hole formed in said panel and a threaded hole formed in a central section of said arm member and connecting said arm member to said panel; and a spring acting on said arm member to bias said arm member so that the arm member pivots towards said second position, wherein in said second position said arm member travels towards said panel when said threaded member is turned in one predetermined direction so that said edge structure can be clamped between opposite end sections of said arm member and said panel.

2. A panel device according to claim 1 wherein said spring is an elongate coil spring having one end thereof connected to said arm member.

3. A panel device according to claim 1 wherein said panel is rectangular and has a width and said arm member has a total length substantially equal to said width.

4. A panel device according to claim 1 wherein said hole formed in the panel is located substantially in the center of said panel.

5. A panel device according to claim 1 wherein said slideway member limits the extent of pivotable movement of said arm member to an angle of approximately 45 degrees.

6. A panel device according to claim 2 wherein said head of the threaded member is a screw-type head located on said outer surface of the panel and engageable with a screwdriver.

7. A panel device according to claim 2 including a stiffener guide provided on said inner surface of the panel and extending about the perimeter of said panel.

8. A panel device according to claim 1 wherein said panel is rectangular and has a length greater than its width and said slideway member limits the extent of pivotable movement of the arm member to an angle of approximately 90 degrees.

9. A detachable grill device for covering an opening in a structure, duct or appliance, said grill device comprising:

a generally flat grill having inner and outer sides;

an elongate fastening arm member positioned adjacent said inner side and extending during use thereof generally parallel to said inner side, said arm member being pivotable relative to said grill between a first position used for insertion of said arm member into said opening and a second position used for clamping said grill to edge structure defining said opening;

a slideway connected to said inner side of the grill and limiting the extent of pivotable movement of said arm member relative to said grill;

a threaded member having a head at one end thereof and a stop at an opposite end thereof, said threaded member extending from said head through a hole formed in the grill and then through a threaded hole formed in a central section of said arm member and connecting said arm member to said grill; and a spring acting on said arm member to bias said arm member so that the arm member pivots towards said second position, wherein in said second position, said arm member travels towards said grill when said threaded member is turned in one predetermined direction so that said edge structure can be clamped between opposite end sections of said arm member and said grill.

10. A grill device according to claim 9 wherein said spring is an elongate coil spring having one end thereof connected to said arm member.

11. A grill device according to claim 9 wherein said slideway limits the extent of pivotable movement of said arm member to an angle of approximately 45 degrees.

12. A grill device according to claim 10 wherein said hole formed in the grill is located substantially in the center of said grill and said head of the threaded member is a screw-type head that can be engaged and turned with a screwdriver.

13. A cover device for covering an opening in a structure, duct or appliance, said device comprising:

a cover with a peripheral edge portion, an inner side and an outer side;

an elongate fastening member located adjacent said inner side and extending during use thereof generally parallel to said inner side, said fastening member being pivotable relative to said cover and about a pivot axis perpendicular to said cover between a first position usable for insertion of said fastening member into said opening and a second position used for clamping said cover to edge structure defining said opening;

means provided on said cover for limiting the extent of said pivotable movement of said fastening member relative to said cover;

a threaded member having a head at one end, extending through a hole formed in said cover and a threaded hole formed in said fastening member, and connecting said fastening member to said cover; and means for biasing said fastening member so that said fastening member pivots about said pivot axis towards said second position;

wherein in said second position said fastening member moves towards said inner side when said threaded member is turned in one predetermined direction so that said edge structure can be clamped between end sections of said fastening member and said peripheral edge portion of the cover.

14. A cover device according to claim 13 wherein said cover is a generally flat panel and said biasing means is a spring.

15. A cover device according to claim 13 wherein said threaded member has a stop provided at an end thereof opposite said head, said stop limiting movement of said fastening member along said threaded member.

16. A cover device according to claim 13 wherein said hole formed in said cover is located substantially in the center of the cover end said threaded hole is formed substantially in the longitudinal center of said fastening member.

17. A cover device according to claim 13 wherein said limiting means is a channel-shaped member extending around said fastening member and limits the extent of pivotable movement of said fastening member to an angle of approximately 45 degrees.

18. A cover device according to claim 17 wherein said head is a screw-type head located on said outer side of the cover and engageable with a screwdriver.

19. A cover device according to claim 13 wherein said cover is a square panel end said fastening member has a length about equal to the width of said panel.

* * * * *